United States Patent [19]

Rozier et al.

[11] 4,082,932
[45] Apr. 4, 1978

[54] HIGH-VOLTAGE ELECTRIC EQUIPMENT CELL

[75] Inventors: Paul Rozier; Pierre Niel, both of Chalon sur Saone; Jean Ferlay, Lyon, all of France

[73] Assignee: Delle-Alsthom S.A., Villeurbanne, France

[21] Appl. No.: 668,257

[22] Filed: Mar. 18, 1976

[30] Foreign Application Priority Data

Jan. 26, 1976 France .............................. 76 02257
Mar. 25, 1975 France .............................. 75 09323

[51] Int. Cl.² ............................................ H01H 33/88
[52] U.S. Cl. ............................ 200/148 R; 200/148 A; 200/150 G
[58] Field of Search .......... 200/148 A, 150 G, 148 R

[56] References Cited

U.S. PATENT DOCUMENTS

| 3,114,815 | 12/1963 | Easley et al. | 200/148 A |
| 3,291,948 | 12/1966 | Telford | 200/148 A |
| 3,740,508 | 6/1973 | Olsen et al. | 200/148 A |
| 3,924,088 | 12/1975 | Heutschi et al. | 200/148 A |

Primary Examiner—Robert S. Macon
Attorney, Agent, or Firm—Haseltine, Lake & Waters

[57] ABSTRACT

Electrical equipment cell of the air insulated type, comprising a switch which connects a first plug which is live, to a second plug, on either side of a wall, the switch being arranged in an assembly formed by a metallic tank fixed on the wall and by two bell-shaped insulators which are assembled on the metallic tank to receive the first and second plugs respectively. A dielectric screen connected to ground is placed in the first bell-shaped insulator between the contacts of the switch in the open position, so that, in the open position, a person placed on the same side as the second bell-shaped insulator cannot come directly into contact with a live part.

8 Claims, 5 Drawing Figures

HIGH-VOLTAGE ELECTRIC EQUIPMENT CELL

FIELD OF THE INVENTION

The invention relates to high-voltage cells whose equipment is of the air insulated type and which comprises a high-voltage switching device in a dielectric gas enclosure.

BACKGROUND

To enable a person to have safe access to the part of the cell which is separated from the line conductors by the opening of the switch, the latter is generally either combined with an isolator, or constituted in such a way that one of its elements, such as a bushing, effecting a separation, is connected with a metallic curtain which comes between the contacts of the device in the open position. These solutions can be sufficient when the extinguishing of the arc is effected in air. But if the cut-out takes place in a fluid having a dielectric rigidity greater than that of air, for example a gas such as sulphur hexafluoride, the preceding arrangements are unsuitable. They generally require the rotating of a bushing whose moment of inertia is fairly high and they thus lead either to a bulky solution if the isolator is in series with the switch, or to a solution which absorbs a great amount of energy, which is hence incompatible with the use of simple automatic equipment, if the bushing is combined with the mobile part of the switch whose movement must be fairly rapid.

SUMMARY OF THE INVENTION

An object of the invention is to provide a cell having a high-voltage switch whose configurations make it possible to ensure the placing out of reach, in satisfactory conditions, the active parts remaining live, when the switch is open.

The invention contemplates an electric equipment cell of the air insulated type, which comprises a switch in a dielectric fluid and crossing a wall to connect a first plug, which is live, situated on a first side of the wall to a second plug situated on the other side of the wall, characterized in that the switch comprises a first bell-shaped insulator receiving the first plug and containing the contacts of the switch and a second bell-shaped insulator receiving the second plug, these two bell-shaped insulators being assembled by a metallic tank fixed on the wall and in that the first bell-shaped insulator comprises, inside, a dielectric screen connected to ground and situated between the contacts of the switch in the open position, so that in the open position of the switch, a person who is on the other side of the wall cannot come into contact with a line part, by direct contact or by the effect of an overvoltage causing contingent spark-over in the switch.

According to another characteristic feature, the extinction of the arc of the switch is effected by a dielectric fluid compressed by the switch itself.

The features and advantages of the invention will become apparent from the description of an embodiment given by way of an example illustrated in the figures.

DETAILED DESCRIPTION

Figure 1:
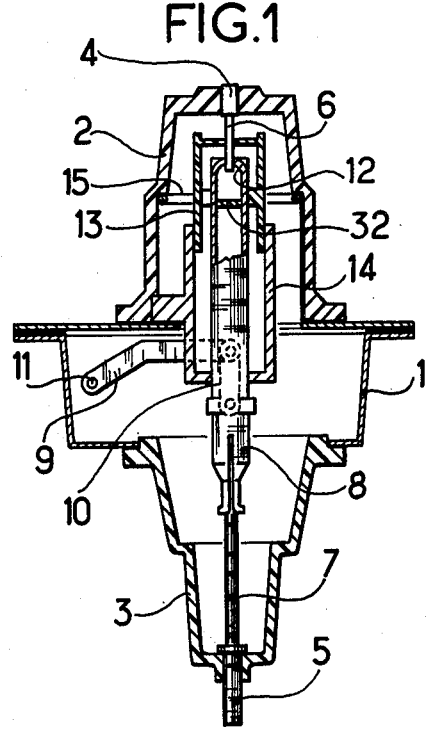
FIG. 1 is a cross-section view of a switch used in the invention in the closed position.

The switch in FIG. 1 comprises a metallic tank 1 on which are installed two bell-shaped insulators 2 and 3 supporting plugs 4 and 5. A rod 6 is fixed to the plug 4 and a rod 7 is fixed to the plug 5. A mobile tube 8, driven by a connecting rod 10 and a lever 9 rotatable about a drive pin 11, ensures the passing of the current. At the upper end of the tube closed by a washer 32, fingers 12 ensure the contact with the rod 6. At its lower end, the tube 8 which acts as a mobile contact is swaged and split and the fingers thus constituted slide on the rod 7. An insulating nozzle 13 fixed to the end of the tube 8 forms a piston which moves inside a cylinder 14 rigidly secured to the bell-shaped insulator 2. A metallic ring constituting a dielectric screen 15 is fixed on the bell-shaped insulator 2 and connected to the tank 1 by the connection 33, which can be seen in FIG. 2. The enclosure of the switch constituted by the tank 1 and the bell-shaped insulators 2 and 3 contains a dielectric gas. Orifices 16, situated between the bell-shaped insulator 2 and the cylinder 14 enable the flow of the gas around the cut-out element constituted by the nozzle 13 and the cylinder 14. In the closed position, the current passes successively through the plug 4, the rod 6, the fingers 12, the tube 8, the rod 7 and the plug 5. At the opening of the switch, the tube 8 is driven downwards by the mechanism formed by the connecting rod 10, the lever 9 and the pin 11; the nozzle 13 compresses the gas in the cylinder 14 and the gas passes through openings 17 formed in the horizontal wall connecting the tube 8 with the nozzle 13. When the rod 6 has come out of the tube 8 and of the nozzle 13, the gas flows out also, passing through the orifice 18 formed at the upper part of the nozzle 13. The resulting gas jet ensures the extinction of the arc set up between the rod 6 and the fingers 12.

Figure 2:
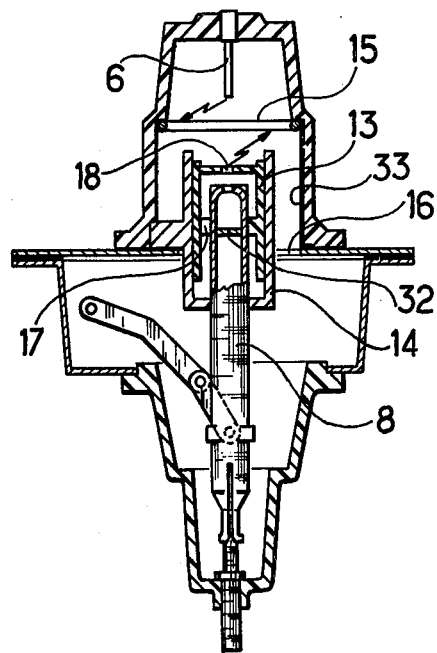
FIG. 2 is a cross-sectional view of the switch in FIG. 1 in the open position.

After the cut-out, at the end of the opening, the device is in the position shown in FIG. 2. The screen 15 is then situated between the rod 6 and the top part of the tube 8. The distance between the rod 6 and the tube 8 withstands voltages higher than the test voltages imposed between the input and the output of the isolators and the distances between the rod 6 and the screen 15 and between the tube 8 and the screen 15 are such that spark-over or creeping always concern the dielectric screen at the ground wire connection 33 and never occurs directly between the rod 6 and the tube 8. Moreover, the gas which surrounds the parts 6, 8 and 15 is permanently in communication with the gas contained in the enclosure of the switch, this removing the danger of deterioration of the dielectric qualities of the gas situated on the opening distance of the device. The screen 15 thus makes it possible to provide an isolating switch without greatly increasing the opening stroke and without adjoining an extra isolating device.

Figure 3:
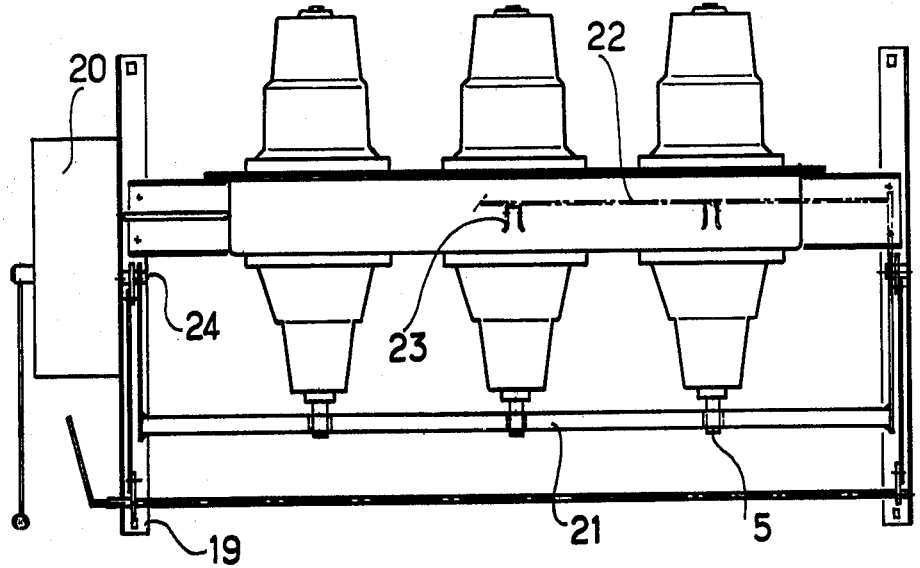
FIG. 3 is a front view of the switch according to FIG. 1.

FIG. 3 is an embodiment of a three-pole device with a frame 19, a control box 20 for performing the various operating cycles and a ground isolator 21 assembled on the frame and capable of ensuring grounding of the lower plugs of the switch. The ground isolator, shown in continuous lines in the closed position and partly in discontinuous lines in the open position, comprises a bar 22 supporting three contact clips 23. The assembly rotates about pivots 24 and, in the closed position, the lower plugs 5 engage in the clips 23.

Figure 4:
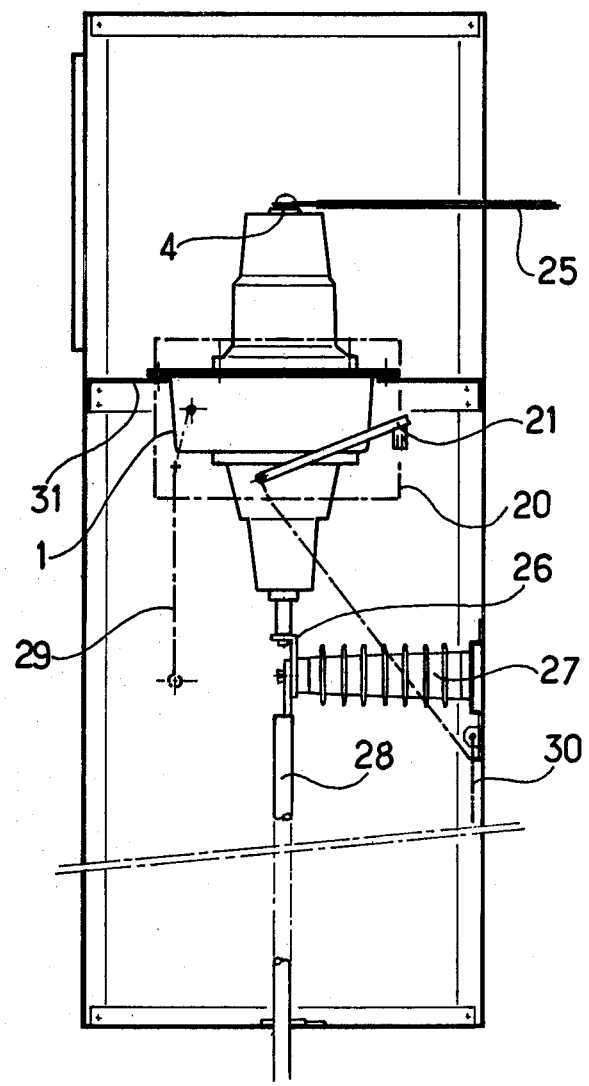
FIG. 4 is a cross-sectional view of a cell fitted with the switch according to FIG. 3 and according to the invention.

In FIG. 4, the switch is installed in its cell. The device, equipped with control box 20 and with ground isolator 21 for the cable head, constitutes an assembly which can easily be dismantled after disconnection of the set of bars 25 connected directly to the plugs 4 and of the connections 26 fixed to the insulator 27 to which the cables 26 are connected. The insulator 27 is also used as a capacitative divider making it possible to detect the presence of voltage and to make the automatic equipment operate. The control means for the switch have been shown diagrammatically at 29 and the control means for the grounded isolator have been shown diagrammatically at 30.

Thus, when the switch is in the open position and the set of bars 25 remains live and the cable 28 remains dead, the tank 1 and a sheet metal partition 31, on which it is fixed, prevent any direct contact between the live parts such as 25 and a person having access to the lower compartment of the cell. The person is also protected against any contingent overvoltage which could cause spark-over in the switch, since spark-over will occur in all cases between the rod 6 connected to the plug 4 and the screen 15 (FIG. 1) and not between the input and the output of the switch. Thus, an operation on the cable or on an element of the lower compartment can be effected with the same safety as in conventional installations.

This is also true when entering the upper compartment when it is dead and when the cable remains charged. The configuration according to the invention has an extra advantage when the cable 28 ends in a cable box, for the presence of the tank 1 and of the partition 31 protects the set of bars 25 against any possible explosion of the cable box.

To great advantage and in a practical way, the gas used is sulphur hexafluoride and the switch can comprise a self-compression type cut-out device. On the other hand, the assembly constituted by the switch, its control means and its accessories can constitute an independent assembly which can easily be dismantled in a cell.

In that type of switch, the cut-out contacts are not visible and the indicating of the open position or closing position is generally given either by the control mechanism or by the operating shaft of the cut-out device. If there occurs a breakage between the control mechanism and the cut-out device or between the operating shaft and the mobile part which moves inside the cut-out device, the indicating becomes inexact and can cause an operation incident which could cause an accident to the personnel.

Figure 5:
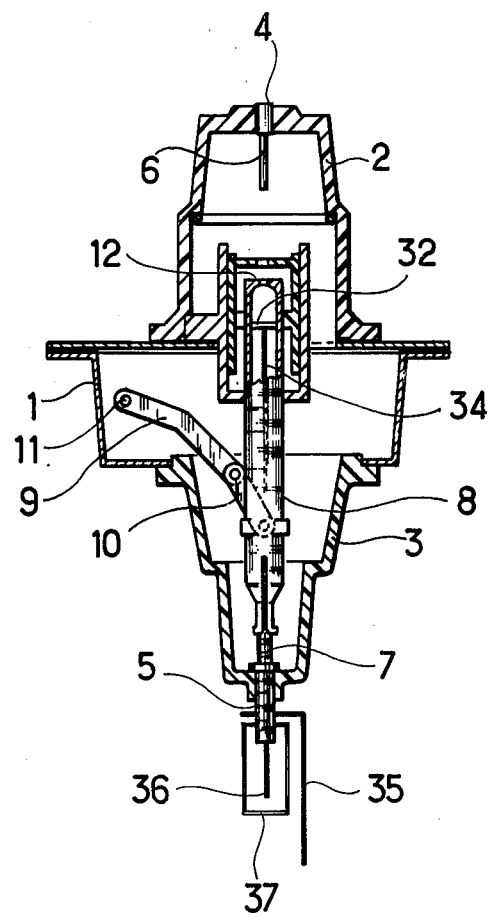
FIG. 5 is a cross-sectional view analogous to that in FIG. 2, but directed to a switch fitted with a position indicator.

To avoid such a drawback, the invention provides an auxiliary part 34, generally a rod, made integral with the mobile cut-out contact and sliding across the second plug 5, so that the appearance of the end of the rod on the outside of the second plug indicates the open position of the cut-out device. This is the configuration shown in FIG. 5.

The rod 34 is directly integral with the mobile tube 8. It can, for example, be fixed to the washer 32. It slides across the output terminal of the cut-out device on which a bracket 35 is installed, said bracket being connected to out-going conductors, not shown. In the closed position of the cut-out device, the end 36 of the rod 34 is hidden inside the plug 5. In the open position, the end 36 of the rod 34 appears on the outside of the plug 5. Preferably, a transparent tube 37 protects the space through which end 36 passes on the outside from shocks.

On each switch of the cell, the appearance of the end 36 of the rod 34 on the outside of the plug 5 indicates with certainty the open position of the mobile part of the switch and completes the information already supplied, for example, by the angular position of the operating shaft rotating about the pin 11.

It is obvious that the invention is in no way limited to the embodiment which has just been described and illustrated and which has been given only by way of example. More particularly, without going beyond the scope of the invention, the particular arrangements can be modified and the constituents can be replaced by equivalent means.

What is claimed is:

1. Electric equipment cell of the air insulated type, which comprises a switch in a dielectric fluid and crossing a wall to connect a first plug, which is live, situated on a first side of the wall to a second plug situated on the other side of the wall, the improvement wherein the switch comprises a first bell-shaped insulator receiving the first plug and containing the contacts of the switch and a second bell-shaped insulator receiving the second plug, a metallic tank fixed on the wall and assembling said two bell-shaped insulators, the first bell-shaped insulator comprising an integral dielectric screen connected to ground and situated between the contacts of the switch in the open position, so that in the open position of the switch, a person who is on the said other side of the wall cannot come into contact with a live part, by direct contact or by the effect of an overvoltage causing contingent spark-over in the switch.

2. Cell according to claim 1, wherein the dielectric fluid is a gas having a rigidity greater than that of air.

3. Cell according to claim 2, wherein the dielectric gas is sulphur hexafluoride.

4. Cell according to claim 1 wherein the switch as a unit including, its control means and its accessories constitute an independent assembly which can easily be dismantled in a cell.

5. Cell according to claim 1 comprising cut-out means for self-compressing the dielectric fluid to effect extinction of the arc between the contacts when the switch is opened.

6. Cell according to claim 1, in which the contact connected to the second plug is the mobile contact, said switch further comprising an auxiliary part secured to the mobile contact and slidable within the second plug to project from the latter, at least in the open position of the switch.

7. Cell according to claim 6 wherein said auxiliary part remains hidden inside the second plug in the closed position of the switch and appears on the outside of that second plug in the open position of the switch.

8. Cell according to claim 6 further comprising a transparent tube surrounding the space through which said auxiliary part passes on the outside of the second plug.

* * * * *